(12) United States Patent
Cussler et al.

(10) Patent No.: US 11,873,227 B2
(45) Date of Patent: Jan. 16, 2024

(54) INTEGRATED APPARATUS FOR PRODUCING AMMONIA

(71) Applicant: REGENTS OF THE UNIVERSITY OF MINNESOTA, Minneapolis, MN (US)

(72) Inventors: Edward Cussler, Minneapolis, MN (US); Alon McCormick, Minneapolis, MN (US); Michael Reese, Minneapolis, MN (US); Deepak Ojha, Minneapolis, MN (US); Matt Kale, Minneapolis, MN (US); Paul Dauenhauer, Minneapolis, MN (US); Prodromos Daoutidis, Minneapolis, MN (US); Mohammadmahdi Malmali, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 683 days.

(21) Appl. No.: 16/849,550

(22) Filed: Apr. 15, 2020

(65) Prior Publication Data
US 2020/0325030 A1 Oct. 15, 2020

Related U.S. Application Data

(60) Provisional application No. 62/834,126, filed on Apr. 15, 2019.

(51) Int. Cl.
*C01C 1/04* (2006.01)
*B01J 8/00* (2006.01)
(Continued)

(52) U.S. Cl.
CPC .............. *C01C 1/0417* (2013.01); *B01J 8/008* (2013.01); *B01J 20/046* (2013.01); *B01J 23/745* (2013.01); *C01C 1/0411* (2013.01)

(58) Field of Classification Search
CPC .......... C01C 1/00–0488; C01C 1/0417; C01C 1/0411; C01C 1/0458; B01J 8/008; (Continued)

(56) References Cited

U.S. PATENT DOCUMENTS 3,531,246 A * 9/1970 Matsen ................. C01C 1/0458
502/64
9,914,645 B2 3/2018 Himstedt
(Continued)

OTHER PUBLICATIONS

Annable, D. Application of the Temkin kinetic equation to ammonia synthesis in large-scale reactors. Chem. Eng. Sci. 1952, 1, 145-196.
(Continued)

*Primary Examiner* — Anthony J Zimmer
*Assistant Examiner* — Syed T Iqbal
(74) *Attorney, Agent, or Firm* — QUARLES & BRADY LLP (57) ABSTRACT

Embodiments of the disclosure provide an apparatus and process for producing ammonia. The apparatus includes a reactor having (i) an inlet to receive an inlet gas comprising nitrogen and hydrogen, (ii) a catalyst and an absorbent disposed within an internal volume of the reactor, the catalyst configured to convert the nitrogen and hydrogen to a reaction mixture including ammonia, unreacted nitrogen, and unreacted hydrogen, the absorbent configured to selectively absorb a portion of the ammonia in the reactor during formation of the reaction mixture, and (iii) an outlet to discharge the reaction mixture from the reactor.

14 Claims, 4 Drawing Sheets

(51) Int. Cl.
*B01J 23/745* (2006.01)
*B01J 20/04* (2006.01)

(58) Field of Classification Search
CPC .... B01J 20/046; B01J 23/745; B01J 2220/42; B01J 2220/606; B01J 20/18; B01J 20/3236; B01J 20/103; B01J 20/3204; B01J 20/3433; B01J 20/3483; Y02P 20/52
See application file for complete search history.

(56) References Cited

U.S. PATENT DOCUMENTS

| | | | |
|---|---|---|---|
| 10,287,173 B2 | 5/2019 | Malmali | |
| 2006/0039847 A1 | 2/2006 | Kaboord | |
| 2012/0016041 A1* | 1/2012 | Hooper | B01J 8/0278 423/658.2 |
| 2015/0125377 A1* | 5/2015 | Himstedt | B01D 53/0462 422/148 |
| 2018/0208475 A1* | 7/2018 | Stanis | C01C 1/0429 |

OTHER PUBLICATIONS

Aoki, T.; et al. Activation on ammonia absorbing reaction for magnesium chloride. J. Phys. Chem. C 2015, 119, 26296-26302.
Bernhard, A. The Nitrogen Cycle: Processes, Players, and Human Impact. Nat. Educ. Knowl. 2010, 3, 25.
Erisman, J. W.; et al. How a century of ammonia synthesis changed the world. Nat. Geosci. 2008, 1, 636-639.
Field, C. B. et al. Climate Change 2014: Impacts, Adaptation and Vulnerability. Part A: Global and Sectoral Aspects. Contribution of Working Group II to the Fifth Assessment Report of IPCC; Cambridge University Press: New York, 2014; pp. 1-32.
Horiuti, J. et al. The mechanism of catalyzed synthesis of ammonia in the presence of doubly promoted iron catalyst. J. Res. Inst. Catal., Hokkaido Univ. 1960, 8, 170-187.
Inoue, Y. et al. Efficient and Stable Ammonia Synthesis by Self-Organized Flat Ru Nanoparticles on Calcium Amide. ACS Catal. 2016, 6, 7577-7584.
Klerke, A.; et al. Ammonia for hydrogen storage: challenges and opportunities. J. Mater. Chem. 2008, 18, 2304-2310.
Kyriakou, V.; et al. Progress in the electrochemical synthesis of ammonia. Catal. Today 2017, 286, 2-13.
Liu, H. Ammonia synthesis catalyst 100 years: Practice, enlightenment and challenge. Chin. J. Catal. 2014, 35, 1619-1640.
Malmali, M.; et al. Ammonia Synthesis at Reduced Pressure via Reactive Separation. Ind. Eng. Chem. Res. 2016, 55, 8922-8932.
Malmali, M.; et al. Converting Wind Energy to Ammonia at Lower Pressure. ACS Sustainable Chem. Eng. 2018, 6, 827-834.
Nielsen, A.; et al. Rate Equation and Mechanism of Ammonia Synthesis at Industrial Conditions. J. Catal. 1964, 3, 68-79.
Palys, M. J. et al. Modeling and Optimal Design of Absorbent Enhanced Ammonia Synthesis. Processes 2018, 6, 91.
Reese, M.; et al. Performance of a Small-Scale Haber Process. Ind. Eng. Chem. Res. 2016, 55, 3742-3750.
Sandler, S. I. Heterogenous Chemical Reactions. Chemical, Biochemical, and Engineering Thermodynamics, 4th ed.; John Wiley & Sons: Hoboken, NJ, 2006; pp. 737-741.
Sehested, J.; et al. Ammonia Synthesis over a Multipromoted Iron Catalyst: Extended Set of Activity Measurements, Microkinetic Models, and Hydrogen Inhibition. J. Catal. 1999, 188, 83-88.
Sharonov, V.; et al. Ammonia sorption on composites 'CaCl2 in inorganic host matrix': isosteric chart and its performance. Int. J. Low-Carbon Technol. 2006, 1, 191-200.
Smith, C. et al. Rates of Ammonia Absorption and Release in Calcium Chloride. ACS Sustainable Chem. Eng. 2018, 6, 11827-11835.
Sorensen, R. Z.; et al. Indirect Reversible High-Density Hydrogen Storage in Compact Metal Amine Salts. J. Am. Chem. Soc. 2008, 130, 8660-8668.
Temkin, M.; et al. Kinetics of ammonia synthesis on promoted catalysts. Acta Physiochim. USSR 1940, 12, 327-356.
Zhang, T. et al. Review on Ammonia Absorption Materials: Metal Hydrides, Halides, and Borohydrides. ACS Appl. Energy Mater. 2018, 1, 232-242.

* cited by examiner

INTEGRATED APPARATUS FOR PRODUCING AMMONIA

CROSS-REFERENCE TO RELATED APPLICATIONS

This patent application claims the benefit of priority of U.S. Provisional Application Ser. No. 62/834,126 filed on Apr. 15, 2019, entitled "Integrated Apparatus for Producing Ammonia," the contents of which are hereby incorporated by reference herein.

STATEMENT REGARDING FEDERALLY SPONSORED RESEARCH

This invention was made with Government support under contract number DE-AR0000804 awarded by DOE, Office of ARPA-E. The Government has certain rights in this invention.

BACKGROUND

Ammonia ($NH_3$) is one of the world's most important chemicals. In addition to its primary use in fertilizers, ammonia can also be used as an efficient coolant or a clean, effective fuel. Manufacturing ammonia has remained surprisingly unchanged for over a century. The Haber-Bosch process has been the predominant process for making ammonia since the early twentieth century. The Haber-Bosch process involves using high pressures and temperatures in large, capital-intensive plants by combining nitrogen gas ($N_2$) and hydrogen gas ($H_2$) over an iron-based catalyst. Although the Haber-Bosch process has undergone decades of optimization, ammonia production still remains limited by thermodynamics to typically less than 20% conversion in a single pass. Once ammonia is produced, it is separated from unreacted $N_2$ and $H_2$, which must then be repressurized, reheated, and recycled. This requires tremendous capital expenditures and a large amount of energy. Haber-Bosch plants account for about 1.5% of global energy consumption. Moreover, the hydrogen gas used in the Haber-Bosch process is typically obtained by steam reforming of natural gas, which releases additional $CO_2$ into the atmosphere.

SUMMARY OF THE INVENTION

In some embodiments, the present disclosure describes apparatuses and methods for producing ammonia. In some embodiments, the apparatus comprises a reactor having (i) an inlet to receive an inlet gas comprising nitrogen and hydrogen, (ii) a catalyst and an absorbent disposed within an internal volume of the reactor, the catalyst configured to convert the nitrogen and the hydrogen to a reaction mixture comprising ammonia, unreacted nitrogen, and unreacted hydrogen, the absorbent configured to selectively absorb a portion of the ammonia in the reactor during formation of the reaction mixture, and (iii) an outlet to discharge the reaction mixture from the reactor.

In further embodiments, a method for producing ammonia is provided. The method comprises (i) feeding an inlet gas comprising nitrogen and hydrogen to a reactor; (ii) contacting the inlet gas with a catalyst and an absorbent disposed within an internal volume of the reactor, the catalyst converting the inlet gas to a reaction mixture comprising ammonia, unreacted nitrogen, and unreacted hydrogen, the absorbent configured to selectively absorb a portion of the ammonia in the reactor during formation of the reaction mixture, and (iii) discharging the reaction mixture from an outlet in the reactor.

These and other advantages and features of the invention will become more apparent from the following detailed description of the preferred embodiments of the invention when viewed in conjunction with the accompanying drawings.

DETAILED DESCRIPTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Values expressed in a range format should be interpreted in a manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

Figure 1:
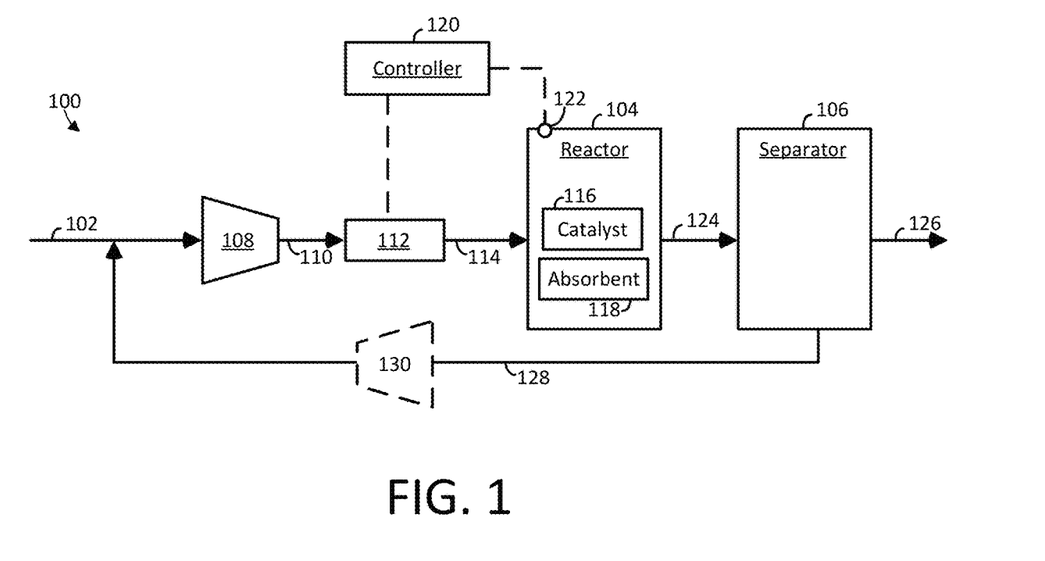
FIG. 1 is a block diagram of an example apparatus for producing ammonia accordance with embodiments of the invention.

Referring now to FIG. 1, an apparatus 100 for producing a gaseous product, such as ammonia ($NH_3$), is shown. In some embodiments, the apparatus 100 includes a gaseous feed line 102 including one or more reactants, a reactor 104 configured to convert the reactants to the gaseous product, and a separation device 106 for purifying the gaseous product.

In some embodiments, the gaseous feed line 102 may include an inlet gas mixture including a variety of reactants for producing the gaseous product. For example, the apparatus 100 may be configured to produce ammonia ($NH_3$) from a gaseous feed line 102 comprising a mixture of nitrogen ($N_2$) and hydrogen ($H_2$). In some embodiments, the nitrogen may be derived from air, and the hydrogen may be derived from a petrochemical source, such as natural gas. However, any source of nitrogen and hydrogen may be used with apparatus 100.

In some embodiments, the gaseous feed line 102 is provided as a single feed line as depicted in FIG. 1, or may be provided as multiple feed lines (not shown). For example, a feed line may be provided for each reactant fed to the reactor 104. In some embodiments, the inlet gas mixture comprises a ratio of hydrogen and nitrogen sufficient to undergo a Haber-Bosch reaction to produce ammonia. Exemplary ratios of $H_2:N_2$ may be provided in a volume ratio of about 1.5:1 to 3.5:1. In some embodiments, the ratio of $H_2:N_2$ may be provided at a molar ratio of about 3:1 (e.g., the stoichiometric ratio for the production of $NH_3$).

In some embodiments, the apparatus 100 includes a first gas transport device 108 having a suction side connected to the gaseous feed line 102 and a discharge side connected to a pre-heat line 110. In general, the gas transport device 108 may be provided as a mechanical device that adjusts (e.g., increases) the pressure of the gas mixture. Suitable gas transport devices may include, but are not limited to, a compressor, multiple compressors, a blower, multiple blowers, or the like.

In some embodiments, the first gas transport device 108 is configured to increase the pressure of the gas mixture to a pressure that ranges from 5 atm to 500 atm, or from 50 atm to 400 atm, or from 200 to 400 atm, or higher. In some embodiments, the first gas transport device 108 is configured to increase the gas mixture to a pressure of at least 5 atm, or at least 10 atm, or at least 15 atm, or at least 20 atm, or at least 25 atm, or at least 30 atm, or at least 35 atm, or at least 40 atm, or at least 45 atm, or at least 50 atm. In some embodiments, the first gas transport device 108 is configured to increase the gas mixture to a pressure of less than 55 atm, or less than 60 atm, or less than 65 atm, or less than 70 atm, or less than 75 atm, or less than 80 atm, or less than 85 atm, or less than 90 atm, or less than 95 atm, or less than 100 atm.

In some embodiments, the apparatus 100 includes a heat transfer device 112 having an inlet side connected to the pre-heat line 110 and an outlet side connected to a reactor feed line 114. In general, the heat transfer device 112 may be provided as a mechanical device that adjusts (e.g., increases or decreases) the temperature of the gas mixture. Suitable heat transfer devices 112 may include equipment that transfers heat energy in a variety of methods including, but not limited to conduction, diffusion, convection, radiation, and advection. Exemplary heat transfer devices 112 include, but are not limited to heat exchangers, electric-resistance heaters, boilers, furnaces, condensers, and combinations thereof.

In some embodiments, the heat transfer device 112 is configured to increase the temperature of the gas mixture to a temperature from 200° C. to 650° C., or from 350° C. to 650° C. In some embodiments, the heat transfer device 112 is configured to increase the temperature of the gas mixture to a temperature of at least 350° C., at least 360° C., at least 370° C., at least 380° C., at least 390° C., at least 400° C., at least 410° C., at least 420° C., at least 430° C., at least 440° C., at least 450° C., at least 460° C., at least 470° C., at least 480° C., at least 490° C., or at least 500° C. In some embodiments, the heat transfer device 112 is configured to increase the temperature of the gas mixture to a temperature of less than 510° C., less than 520° C., less than 530° C., less than 540° C., less than 550° C., less than 560° C., less than 570° C., less than 580° C., less than 590° C., less than 600° C., or less than 650° C.

In some embodiments, the reactor feed line 114 places the reactor 104 in fluid communication with the heat transfer device 112. Unlike conventional Haber-Bosch processes, the reactor 104 in apparatus 100 includes both a catalyst 116 and an absorbent 118 configured in an internal volume of the reactor. The combination of the catalyst 116 and the absorbent 118 achieves a surprising and unexpected conversion of nitrogen and hydrogen to ammonia that is beyond what is achievable with the catalyst alone when operating under the conventional Haber-Bosch process. Without being bound to a particular theory, it is contemplated that the conversion of reactants to product while using a catalyst alone is hindered due to the reverse reaction of ammonia to hydrogen and nitrogen. However, by intermixing the absorbent 118 in the reactor 104 with the catalyst 116, ammonia is selectively absorbed into the absorbent during the course of the reaction, thereby reducing the prevalence of the reverse reaction and promoting further conversion of the reactants to product.

The catalyst 116 and absorbent 118 may be arranged within the reactor 104 in a variety of ways. For example, the catalyst 116 and absorbent 118 may be intermixed in a fixed bed arrangement, such as a single bed within the reactor 104. The catalyst 116 and the absorbent 118 may comprise from 0.1% to 99.9% of the volume of the reactor 104. In some embodiments, the catalyst 116 and the absorbent 118 may comprise at least 10% of the volume of the reactor 104, at least 20%, at least 30%, at least 40%, at least 50%, at least 60% of the volume of the reactor 104. In some embodiments, the single bed may comprise less than 70%, less than 80%, or less than 90% of the volume of the reactor 104.

In some embodiments, the catalyst 116 is present in the reactor 104 in a weight range from 5% (w/w) to 95% (w/w). The weight percent may be based on the total components disposed within the internal volume of the reactor 104 or based on the total weight of both the catalyst 116 and the absorbent 118. In some embodiments, the catalyst is present in the reactor 104 at a weight percent of at least 5% (w/w), at least 10% (w/w), at least 15% (w/w), at least 20% (w/w), at least 25% (w/w), at least 30% (w/w), at least 35% (w/w), at least 40% (w/w), at least 45% (w/w), or at least 50% (w/w). In some embodiments, the catalyst 116 is present in the reactor 104 of less than 55% (w/w), of less than 60% (w/w), of less than 65% (w/w), of less than 70% (w/w), of less than 75% (w/w), of less than 80% (w/w), of less than 85% (w/w), of less than 90% (w/w), or of less than 95% (w/w).

In some embodiments, the absorbent 118 is present in the reactor 104 in a weight range between about 5% (w/w) and 95% (w/w) of the total components disposed therein. In some embodiments, the absorbent 118 is present in the reactor 104 at a weight percent of at least 5% (w/w), at least 10% (w/w), at least 15% (w/w), at least 20% (w/w), at least 25% (w/w), at least 30% (w/w), at least 35% (w/w), at least 40% (w/w), at least 45% (w/w), or at least 50% (w/w). In some embodiments, the absorbent 118 is present in the reactor 104 of less than 55% (w/w), of less than 60% (w/w), of less than 65% (w/w), of less than 70% (w/w), of less than 75% (w/w), of less than 80% (w/w), of less than 85% (w/w), of less than 90% (w/w), or of less than 95% (w/w).

In some embodiments, the catalyst and absorbent are present in the reactor 104 in a weight ratio of catalyst to absorbent between about 1:20 and 20:1 (catalyst:absorbent). In some embodiments, the weight ratio of catalyst to absorbent is about 1:20, about 1:15, about 1:10, about 1:5, about 1:1, about 5:1, about 10:1, about 15:1, or about 20:1.

In some embodiments, the catalyst 116 and absorbent 118 may be arranged in multiple vertical or horizontal beds interspaced throughout the reactor 104. In some embodiments, trays, partitions, or tubes are used to support and separate the vertical or horizontal beds within the reactor. In some embodiments, the reactor 104 may include from 2 to 5, or 2 to 10, or 2 to 15, or 2 to 20 vertical or horizontal beds. In some embodiments, the reactor may include at least 2 vertical or horizontal beds, or at least 3, or at least 4, or at least 5, or at least 6, or at least 7, or at least 8, or at least 9, or at least 10, or at least 20, or at least 30. In some embodiments, the reactor 104 includes less than 35 vertical or horizontal beds, or less than 40, or less than 50, or less than 60, or less than 70, or less than 80, or less than 90, or less than 100.

In some embodiments, the apparatus 100 further includes a controller 120 in electrical communication with a temperature sensor 122 and one or more heat transfer device 112. In some embodiments, the temperature sensor 122 is configured to detect a temperature signal corresponding to a temperature of the reactor, and the heat transfer device 112 is configured to increase or decrease the temperature of the reactor 104. Although not shown in FIG. 1, an additional heat transfer device may be coupled to the reactor 104 to modulate the temperature of the reactor 104.

In some embodiments, the controller 120 is placed in electrical communication with the temperature sensor 122 and the heat transfer device 112, and is programmed to receive the temperature signal from the temperature sensor 122 and instruct the heat transfer device to maintain an average temperature of the reactor 104 of at least 350° C., at least 360° C., at least 370° C., at least 380° C., at least 390° C., at least 400° C., at least 410° C., at least 420° C., at least 430° C., at least 440° C., at least 450° C., at least 460° C., at least 470° C., at least 480° C., at least 490° C., or at least 500° C. In some embodiments, the heat transfer device 112 is configured to increase the temperature of the gas mixture to a temperature of less than 510° C., less than 520° C., less than 530° C., less than 540° C., less than 550° C., less than 560° C., less than 570° C., less than 580° C., less than 590° C., less than 600° C., or less than 650° C. In some embodiments, the controller 120 is programmed to operate the reactor 104 under isothermal conditions.

In some embodiments, a fraction of the vertical or horizontal beds are configured with catalyst 116 and exclude absorbent 118. Such an arrangement may facilitate replacing the catalyst 116 as activity declines over extended periods of use. For example, the partitions, trays, or tubes comprising the catalyst 116 may be selectively removed to be regenerated or replaced. The fraction of vertical or horizontal beds that are configured with catalyst and exclude absorbent may include at least 10% of the vertical or horizontal beds, or at least 20%, or at least 30%, or at least 40%, or at least 50%, or more. In some embodiments, a fraction of the vertical or horizontal beds are configured with absorbent 118 and exclude catalyst 116. Such an arrangement may facilitate regenerating the absorbent 118 by desorbing the gaseous product from the absorbent. Similar to above, the partitions, trays, or tubes comprising the absorbent 118 may be selectively removed to regenerate or replace the absorbent. For example, the fraction of vertical or horizontal beds that are configured with absorbent 118 and exclude catalyst 116 may include at least 10% of the vertical or horizontal beds, or at least 20%, or at least 30%, or at least 40%, or at least 50%, or more.

In some embodiments, the reactor 104 comprises a moving bed reactor. In a moving bed arrangement, the gas mixture from the reactor feed line 114 is fed upward through a packed bed of catalyst 116 and absorbent 118 in the reactor 104. In the moving bed arrangement, fresh, regenerated, and/or reconditioned catalyst and absorbent are fed to the top of the reactor 104, where the catalyst 116 and absorbent 118 move downward under the influence of gravity in a manner that may approximate plug flow, and are removed from the bottom of the reactor 104. The catalyst 116 and absorbent 118 are then transferred to the top of the reactor 104 using, for example, external equipment to effect pneumatic transport, mechanical transport, or the like. During the time the catalyst 116 and absorbent 118 are not in the reactor, they may be regenerated or reconditions in an adjacent facility or chamber. Desorbed gaseous product (e.g., ammonia) may be collected in the adjacent facility or chamber before recycling the regenerated or reconditioned catalyst 116 and absorbent 118 to the top of the reactor.

In some embodiments, the catalyst 116 in the reactor 104 includes materials that promote the conversion of $N_2$ and $H_2$ to $NH_3$. In some embodiments, the catalyst 116 is a metallic catalyst. As used herein, the terms "metallic catalyst" and "metal catalyst" are used interchangeably herein and refer a metal that promotes the conversion of $N_2$ and $H_2$ to $NH_3$ and may be dispersed on a support material. The support material may be a high surface area, porous, composed of a metal oxide (e.g., $Al_2O_3$, $SiO_2$, $TiO_2$, CaO, MgO), zeolites, carbons, and combinations thereof. In some embodiments, the metallic catalyst includes a transition metal selected from Mo, W, Re, Fe, Co, Ru, Os, and combinations thereof. The metallic catalyst may further include promoters to enhance activity e.g., alkali metals, alkali metal compounds, alkaline earth metal compounds, and combinations thereof. Exemplary catalysts 116 include, but are not limited to, iron oxide-based catalysts, such as magnetite ($Fe_3O_4$), wustite (FeO), or ruthenium-based catalysts, such as $Ru/Al_2O_3$, $Ru/MgO$, $Ru/SiO_2$, $Ru/TiO_2$, and Ru/CaO.

In some embodiments, the absorbent 118 comprises a metal salt that has an absorption affinity for $NH_3$ over $N_2$ or $H_2$. As used herein, the term "absorbent" refers to materials having capacity to take up a target species into the material. "Absorbents" or "solid absorbents" refer to and encompass salts such as metal halide salts (e.g., $MgCl_2$, $CaCl_2$), $MgBr_2$, $CaBr_2$, MgClBr, CaClBr, or MgCaBr), and salts plus optionally a solid support (e.g., silica (Si), zeolite (Ze)). In some embodiments, solid absorbent described herein comprise, consist of, or consist essentially of a metal halide and a solid support. The combination of the metal halide and solid support forms a solid absorbent capable of increased absorption of ammonia as compared with the metal halide alone. The absorbents may include a metal halide salt that has been calcined with a solid support. Additionally or alternatively, the absorbent may be a metal halide salt that is mixed or blended with a solid support.

The solid absorbents described herein selectively absorb ammonia ($NH_3$) and do not absorb (or absorb low levels of) the unreacted hydrogen gas ($H_2$) or unreacted nitrogen gas ($N_2$) that may be in the reaction mixture. As used herein, the term "absorb" refers to taking up a target species into a solid (e.g., a crystal salt or crystal salt in combination with a solid support). In some cases, absorption is selective. The term "selectively absorb," "selective absorption," "selective absorption affinity," or similar terms are used herein to refer to an absorbent having an affinity for one compound over another, in this case for $NH_3$ product gas over $H_2$ or $N_2$ gas. Selective absorption of $NH_3$ with an absorbent refers to absorbing a substantially higher proportion of $NH_3$ present from the reaction product mixture into the absorbent while letting substantially higher proportion of the $H_2$ or $N_2$ gas pass through or by the absorbent. The absorbed ammonia can later be easily and rapidly released from the solid absorbent. As used herein, the term "release" refers to desorption of ammonia or another species after absorption. The term release is used to distinguish the process of desorption following adsorption, which refers to uptake of a target species onto the surface of a solid (e.g., a solid surface made microporous to increase the available surface area). Suitable examples of methods of desorbing from the solid support would be understood by one skilled in the art, for example by simply increasing the temperature or lowering the pressure.

In some embodiments, the absorption described herein can take place even at temperatures over 300° C. and can exceed four moles of salt at lower temperatures. The process is much more like hydration, where the ammonia takes the place of water to form "ammoniates" The amount and the selectivity in these absorptions are much greater than those expected for adsorption, where the gas being separated adheres to the crystal surface and does not penetrate significantly into the solid.

In an example, the metal salt comprises a compound having the general formula [1]:

$$M_aX_b \qquad [1]$$

where M is a metal cation. X is an anion atom or group, a is a positive integer, for example from 1 to 3, and b is a positive integer, for example from 1 to 8. Examples of metal cations M that have been found to be particularly useful in forming the $NH_3$ absorbent 19 when used as part of the metal salt compound of general formula [1] include, but are not limited to, an alkaline earth metal or a transition metal.

Examples of anion atoms or groups that have been found to be particularly useful in forming the absorbent 118 when used as part of the metal salt compound of general formula [1] include, but are not limited to, halide ions (i.e., $Cl^-$, $B^-$, $I^-$, or $F^-$), or nitrate groups ($NO_3^-$).

In some embodiments, the metal cation comprises an alkaline earth metal. Examples include, but are not limited to, magnesium ($Mg^{2+}$), calcium, strontium, group 12 transition metal cations, zinc.

In some examples, the absorbent 118 comprises two or more metal salt absorbent materials each having the general formula $M_aX_b$, i.e., with each of the one or more metal salt absorbent materials comprising the same metal cation M or different metal cations $M^1$, $M^2$, etc., and with each of the one or more metal salt absorbent materials comprising the same anion atom or group X or different anion atoms or groups $X^1$, $X^2$, etc. Therefore, in one example, the absorbent 118 includes a mixture of two or more different metal salt absorbent materials, wherein each of the metal salt absorbent materials include the same metal cation, but with two more anion atoms or groups, e.g., a mixture of three different metal salt absorbent materials wherein all three are formed with the same metal cation $M^1$, but with three different anion atoms or groups $X^1$, $X^2$, and $X^3$ (e.g., the absorbent 118 comprises a mixture of $M^1_aX^1_b$, $M^1_aX^2_b$, and $M^1_aX^3_b$).

In another example, the absorbent 118 can be made from a mixture of two or more metal salt absorbent materials comprising two or more different metal cations M wherein a particular metal salt absorbent can include the same anion atom or group X as one or more of the other metal salt absorbent materials in the mixture e.g., a mixture of three different metal salt absorbent materials made from three different metal cations $M^1$, $M^2$, and $M^3$, but with the same anion atom or group X (e.g., the absorbent 118 comprises a mixture of $M^1_aX^1_b$, $M^2_aX^1_b$, and $M^3_aX^1_b$). In yet another example, each metal salt absorbent material of the mixture can include a different metal cation and a different anion group from one or more of the other metal salt absorbent materials. Therefore, in an example, the absorbent 118 comprises a mixture of three different metal salt absorbent materials that each include a unique metal salt cation and a unique anion atom or group (e.g., the absorbent 118 comprises a mixture of $M^1_aX^1_b$, $M^2_aX^2_b$, and $M^3_aX^3_b$).

In another example, the absorbent 118 comprises a mixture of three different metal salt absorbent materials formed from two different metal cations and from two or three different anion atoms or groups (e.g., a mixture of $M^1_aX^1_b$, $M^1_aX^2_b$, and $M^2_aX^2_b$, or a mixture of $M^1_aX^1_b$, $M^1_aX^2_b$, and $M^2_aX^3_b$). In another example, the absorbent 118 comprises a mixture of three different metal salt absorbent materials formed from three different metal cations and from two different anion atoms or groups (e.g., a mixture of $M^1_aX^1_b$, $M^2_aX^2_b$, and $M^3_aX^2_b$).

In some embodiments, the absorbent 118 has a sorbent capacity (mg $NH_3$/g absorbent) of at least 200 mg $NH_3$/g absorbent. In some embodiments, the absorbent 118 has a sorbent capacity from 200 mg $NH_3$/g absorbent to 1000 mg $NH_3$/g absorbent. The weight of absorbent ("g absorbent") in the sorbent capacity values may be based on the metal salt weight alone or based on the metal salt and the solid support weight. In some embodiments, the absorbent 118 has a sorbent capacity of at least 200 mg $NH_3$/g absorbent, at least 225 mg $NH_3$/g absorbent, at least 250 mg $NH_3$/g absorbent, at least 275 mg $NH_3$/g absorbent, at least 300 mg $NH_3$/g absorbent, at least 325 mg $NH_3$/g absorbent, at least 350 mg $NH_3$/g absorbent, at least 375 mg $NH_3$/g absorbent, at least 400 mg $NH_3$/g absorbent, or at least 425 mg $NH_3$/g absorbent, or at least 450 mg $NH_3$/g absorbent, or at least 475 mg $NH_3$/g absorbent, or at least 500 mg $NH_3$/g absorbent. In some embodiments, the absorbent 118 has a sorbent capacity of less than 525 mg $NH_3$/g absorbent, or less than 550 mg $NH_3$/g absorbent, or less than 575 mg $NH_3$/g absorbent, or less than 600 mg $NH_3$/g absorbent, or less than 625 mg $NH_3$/g absorbent, or less than 650 mg $NH_3$/g absorbent, or less than 675 mg $NH_3$/g absorbent, or less than 700 mg $NH_3$/g absorbent, or less than 725 mg $NH_3$/g absorbent, or less than 750 mg $NH_3$/g absorbent, or less than 775 mg $NH_3$/g absorbent, or less than 800 mg $NH_3$/g absorbent, or less than 825 mg $NH_3$/g absorbent, or less than 850 mg $NH_3$/g absorbent, or less than 875 mg $NH_3$/g absorbent, or less than 900 mg $NH_3$/g absorbent, or less than 925 mg $NH_3$/g absorbent, or less than 950 mg $NH_3$/g absorbent, or less than 975 mg $NH_3$/g absorbent, or less than 1000 mg $NH_3$/g absorbent.

In some embodiments, the absorbent 118 has a coordination number of at least 1.5 $mol_{NH3}/mol_{salt}$. In some embodiments, the absorbent 118 has a coordination number from 1.5 to 6 $mol_{NH3}/mol_{salt}$. The moles of salt ("$mol_{salt}$") in the coordination number values may be based on the metal salt weight alone or based on the metal salt and the solid support weight. In some embodiments, the absorbent 118 has a coordination number of at least 1.5 $mol_{NH3}/mol_{salt}$, or at least 2 $mol_{NH3}/mol_{salt}$, or at least 2.5 $mol_{NH3}/mol_{salt}$, or at least 3 $mol_{NH3}/mol_{salt}$. In some embodiments, the absorbent 118 has a coordination number of less than 3.5 $mol_{NH3}/mol_{salt}$, or less than 4 $mol_{NH3}/mol_{salt}$, or less than 4.5 $mol_{NH3}/mol_{salt}$, or less than 5 $mol_{NH3}/mol_{salt}$, or less than 5.5 $mol_{NH3}/mol_{salt}$, or less than 6 $mol_{NH3}/mol_{salt}$.

In some embodiments, the apparatus 100 includes a separation unit 106 that is configured to purify the gaseous product. A reactor outlet line 124 may be configured to place the reactor 104 in fluid communication with the separation unit 106. In general, the separation unit 106 may be provided to purify the gaseous product to a purity between 80% and 99.9%. For example, the separation unit 106 may be configured to achieve a purity of about 80%, about 85%, about 90%, about 95%, about 96%, about 97%, about 98%, about 99%, about 99.5%, or about 99.9%. In general, the separation unit 106 includes product outlet line 126 configured to remove the gaseous product from the separation unit 106, and a recycle line 128 configured to return unreacted gases back to the reactor 104. In some embodiments, the recycle line 128 includes an optional gas transfer device 130 (indicated by dotted lines) that is configured to transport the unreacted gases back to the gaseous feed line 102. Alternatively or additionally, the recycle line 128 may be fed to may be configured to recycle the unreacted gases to the pre-heat line 110 and/or the reactor inlet line 114 (not shown).

In some embodiments, the separation unit 104 includes a device or series of devices configured to separate ammonia ($NH_3$) from nitrogen and hydrogen to attain the desired purity. Exemplary separation units 106 include, but are not limited to, condensation units or absorption units.

In some embodiments, the separation unit 106 comprises a condensation unit. The condensation unit may be configured to cool the gaseous product to a temperature sufficient to generate an ammonia liquid stream to separate the ammonia product from the unreacted hydrogen and nitrogen gases. In some embodiments, the condensation unit may be configured to cool the gaseous product stream to a temperature between −50° C. and 0° C. The ammonia liquid stream may then be removed from the separation unit 106 via the product outlet line 126. The condensation unit is then configured to recycle the unreacted gases to the gaseous feed line 102 via recycle line 128.

In some embodiments, the separation unit 106 comprises an absorption unit. In some embodiments, the absorption unit comprises a first absorption column and a second absorption column each having an absorbent configured therein. Suitable absorbents include materials that selectively absorb ammonia, as described above. During operation, gaseous product from the reactor 104 may be fed to the first absorption column via the reactor outlet line 124, which may be referred to as the "on-line absorption column," while the second absorption column is isolated (e.g., using valves) from the gaseous product. As gaseous product is fed to the first absorption column, the gas product (e.g., ammonia) is selectively absorbed by the absorbent. Unreacted gases flow through the first absorption column and may be configured to recycle back to the gaseous feed line 102 via recycle line 128, or may be discarded. After a period of time, the gaseous product exiting the reactor 104 may be transferred from the first absorption column to the second absorption column, and the first absorption column may be isolated (e.g., using valves) from the reactor outlet line 124. The first absorption column may be regenerated, for example, by heating the absorbent to a temperature sufficient to desorb the gaseous product from the absorbent. The gaseous product may be collected through the product outlet line 126. This process may be configured to continually collect gaseous product.

Examples

The following examples set forth, in detail, ways in which the apparatus 100 produces ammonia from hydrogen and nitrogen, and will enable one of skill in the art to more readily understand the principles thereof. The following examples are presented by way of illustration and are not meant to be limiting in any way.

Materials:

Unless otherwise mentioned, all chemicals were ACS reagent (≥99.8% purity) and used as purchased without further purification. Anhydrous, magnesium chloride (powder form, >98% purity), nickel chloride (granular form, >93% purity), and silica gel (technical grade) were purchased from Sigma-Aldrich (St. Louis, Mo.).

Supported sorbent materials were prepared using a liquid impregnation technique. Prior to impregnation, both 10 g of salt and 15 g of support were dried in a vacuum tube furnace at 450° C. with a nitrogen sweep flow. Then, the salt and support were added to a two-neck flask containing 100 mL of both ethanol (200 proof) and methanol (200 proof). The contents of the flask were stirred, heated, and fully refluxed for about 3 h with nitrogen purging. After the solvent was evaporated under vacuum, the residue was dried in a vacuum oven at 120° C. for 24 h. The supported nickel chloride absorbent was prepared by physically mixing the desired amount of nickel chloride and silica gel, using a mortar and pestle.

Examples Experimental Set-Up

In the following examples, the experiments were conducted in a 300 mL stainless steel reactor supplied by Parr Instrument Company (model 4570, Moline, Ill.). This cylindrical reactor was 6.4 cm in diameter and 10 cm deep, with a working volume of 322 cm³. The temperature was measured using a J-type (iron-constantan) thermocouple furnished with a sealed ⅛" OD stainless steel sheath. An Ashcroft (model G3) electronic pressure transducer was used to measure the reactor pressure. The voltage output from the thermocouple and pressure transducer was sent to the computer. LabVIEW software (Austin, Tex.) was employed to control the mass flow controller (Brooks Instruments, Hatfield, Pa.) and record the pressure data. The catalyst and absorbent varied in amounts but typically filled 80 cm$^3$.

A prereduced nonstoichiometric ferrous oxide (wustite) catalyst (AmoMax10, Clariant, Charlotte, N.C.) was used in these experiments. The catalyst was activated under a hydrogen flow (75%) for 48 h from room temperature to 470° C. Once catalyst activation was complete, the reactor was cooled down to room temperature, and the absorbent materials were poured into the reactor under positive $N_2$ pressure. The two solids were mixed by inverting the column. The reactor was then heated to 200° C. and maintained for 2 h under a $N_2$ flow (500 cm$^3$/min) to drive out any moisture present in the salt. The reactor was then heated to 400° C. and maintained for 4 h under a nitrogen sweep flow to stabilize the temperature.

In the following examples, the apparatus was initially charged with hydrogen and nitrogen with a stoichiometric ratio of 3:1 until the desired pressure of 27 bar was achieved. Then, the inlet valve was closed, and the mixture was stirred continuously at 700 rpm throughout the test. The reactor pressure was monitored and used to evaluate the apparent ammonia production rate. After each test, the reactor was depressurized and heated to 450° C. and atmospheric pressure with 250 cm$^3$/min of nitrogen sweep for 2 h to regenerate the absorbent. The experiments with only an absorbent were conducted by charging the reactor with pure $NH_3$ to 2.7 bar. The inlet was closed, and the pressure was monitored over time. Separate experiments show that when supported, the absorbent is stable for over 100 cycles.

Theory:

Ammonia can be synthesized by putting a catalyst and an ammonia-selective absorbent in a small vessel. In some embodiments, such a vessel is operated in a semi-batch mode: the contents of the vessel, charged with $N_2$ and $H_2$, would begin to react. It would then be fed more feed gases to keep the overall pressure constant. These gases would react to produce ammonia on the catalyst, followed by desorption from the catalyst surface and diffusion to the absorbent. When the absorbent is effectively saturated, the pressure would be reduced to release the ammonia.

In the subsequent examples, experiments are conducted in a simpler batch experiment. For every four moles of $N_2$ and $H_2$ that react, two moles of ammonia are produced; by this stoichiometry, the total number of moles in the vapor space of the vessel is reduced with time, which causes a decrease in the total pressure. The change in the total pressure provides a simple measure of process kinetics. To understand the change in system pressure, consider a mass balance on the vessel itself. The total number of moles in the vessel vapor space is (pV/RT), where p, V, and T are the pressure, the vapor space volume, and the temperature, respectively. The change in the total number of moles is $K(c_1^*-c_1)$, where K is an apparent rate constant, $c_1$ is the concentration at time t, and $c_1^*$ is the concentration at equilibrium. A mass balance in terms of pressure instead of concentration gives $$V\frac{dp}{dt} = -K(p - p^*), \quad \text{(eqn. 1)}$$

where p is the total pressure inside the vessel, and p* is the pressure that will exist when the reaction reaches equilibrium. This constant K is evaluated in the following examples. This mass balance is subject to the initial condition t=0 and p=p$_0$.

Integrating eqn. 1 at the initial conditions to evaluate the integration constant, the pressure can be related to time via the constant K to get $$\frac{p - p^*}{p_0 - p^*} = e^{\frac{-Kt}{V}} = 1 - \frac{Kt}{V} + \dots \quad \text{(eqn. 3)}$$

The decaying exponential is approximated by the linear term in a Taylor expansion as shown, from which K can be fitted to experimental data and interpreted in the context of catalytic and absorption kinetics.

Within the vessel, the ammonia concentration is assumed to change from place to place more quickly than the total concentration. A pseudo-steady-state model idealizes the system as three well-mixed regions: a well-mixed region that includes the catalyst, a well-mixed region containing the absorbent, and a well-mixed region in the gas itself. In the catalyst region, we assume a first-order reversible reaction. This means the carefully studied nonlinear chemical details are being approximated; so, one can more easily focus on the interaction of reaction and separation. Such an apparent first-order reaction also includes mass transport effects within the catalyst, leading to ideas like effectiveness factor. Within the catalyst region, the rate of synthesis r is defined as $r = k_{cat} M_{cat}(c_1^* - c_1|_{cat})$ (eqn. 4) where $k_{cat}$ is the rate constant for the catalytic reaction; $M_{cat}$ is the total mass of the catalyst; c1* is the concentration of ammonia that would exist at equilibrium; and $c_1|_{cat}$ is the concentration of ammonia that exists at the boundary between the catalytic region and the gas region. Note the synthesis rate r here is in moles of ammonia per time and is not normalized by the amount of the catalyst.

We next turn to the resistance of moving the ammonia from the catalyst to the absorbent. In past studies, this was effected by a pump. Now, there is no pump, and the transport is by diffusion. There are two resistances to diffusion: one from the surface of the catalyst to the bulk, and another from the bulk to the absorbent. To find the first of these, we assume that the catalyst consists of spheres of one size, and in the well-mixed absorbent region, mass transfer to and from any single catalyst sphere is described by a mass transfer coefficient equal to ammonia's diffusion coefficient estimated by the sphere's radius. Thus, the rate r is equal to the amount of ammonia diffusing away from the catalyst to the bulk $$r = \frac{D}{R_{cat}} A_{cat}(c_1|_{cat} - c_1). \quad \text{(eqn. 5)}$$

Similarly, assuming absorbent consists of spheres of equal radius, the rate r of ammonia diffusing from the bulk to the absorbent surface is $$r = \frac{D}{R_{cat}} A_{cat}(c_1 - c_1|_{cat}). \quad \text{(eqn. 6)}$$

In these equations, D is the diffusion of ammonia in the gas; $A_{cat}$ and $A_{abs}$ are the total surface area of the catalyst and the absorbent, respectively; and Rcat and Rabs are the radii of the catalyst and the absorbent particles, respectively. The mass transfer coefficient away from the catalyst pellets ($D/R_{cat}$) or to the absorbent ($D/R^{abs}$) implicitly assumes that transport is only by diffusion, that it is not enhanced by free or forced convection. This estimates a rate slower than any other mechanism. The concentration $c_1$ is that in the bulk, and the concentration $c_1|_{abs}$ is the concentration that exists at the surface of the absorbent region. The concentration difference here does not directly include properties of the reaction or the absorption of ammonia. Rather, these concentrations describe the diffusion flux leaving the catalyst or going to the absorbent.

A fourth equation describes the uptake kinetics of ammonia within the absorbent $r=k_{abs}A_{abs}(c_1|_{cat}-c_1^+)$ (eqn. 7) where $k_{abs}$ is the rate constant for absorption; $A_{abs}$ is the total area of the absorbent, and $c_1^+$ is an average gas-phase concentration of ammonia deep in the absorbent particles. If absorption into the solid occurs rapidly, then this concentration would be that in equilibrium with the solid; however, in many cases, the concentration will be an average due to earlier cycles of absorption and desorption that is not equal to the thermodynamic value. A combination of the rate expressions eliminates the intermediate concentrations at the surface of the catalyst, in the bulk gas, and at the surface of the absorbent to find an expression for the system rate at which ammonia is produced $$r = \frac{c_1^* - c_1^+}{\left[\frac{1}{k_{cat}M_{cat}} + \frac{R_{cat}}{DA_{cat}} + \frac{R_{abs}}{DA_{abs}} + \frac{1}{k_{abs}M_{abs}}\right]}. \quad \text{(eqn. 8)}$$

The numerator in eqn. 8 is the concentration difference responsible for the reaction and absorption. The denominator, the total resistance, is composed of four terms. The first term, involving $k_{cat}$, is the resistance due to the catalytic reaction. The second and third are the resistances due to diffusion. The fourth of these terms is the resistance due to the absorption. There is no resistance to a pump, as in earlier theories, because here, there is no pump.

Eqn. 8 may be written in a different form to connect it with the experimentally defined result in eqn 3. If the catalyst and absorbent particles are spherical and intraparticle diffusion is not significant, the areas of the catalyst and absorbent can be estimated in terms of parameters that are more experimentally accessible. The resistances from the catalyst to the bulk gas and of the bulk gas to the absorbent are formed to be the $$\frac{R_{cat}}{DA_{cat}} = \frac{R_{cat}}{D} \cdot \frac{\rho_{cat}}{M_{cat}} \cdot \frac{\frac{4}{3}pR_{cat}^3}{4pR_{cat}^2} = \frac{\rho_{cat}R_{cat}^2}{3DM_{cat}} \quad \text{and} \quad \text{(eqn. 9)}$$

$$\frac{R_{abs}}{DA_{abs}} = \frac{\rho_{abs}R_{abs}^2}{3DM_{abs}}, \quad \text{(eqn. 10)}$$

where $\rho_{cat}$ and $\rho_{abs}$ are the density of the catalyst and absorbent, respectively. Equations 8-10 are then combined with eqn. 3 and rearranged to obtain $$\frac{p_0 - p^*}{p_0 - p} = \left\{\left[\frac{1}{k_{cat}} + \frac{\rho_{cat}R_{cat}^2}{3D}\right]\frac{1}{M_{cat}} + \left[\frac{\rho_{abs}R_{abs}^2}{3D} + \frac{1}{k_{abs}}\right]\frac{1}{M_{abs}}\right\}\frac{V}{t}. \quad \text{(eqn. 11)}$$

Note K is the quantity in braces. This result is used to analyze our experiments and to determine the mechanism responsible for ammonia formation.

Results:

The following examples are divided into three parts. Example 1 measures the catalyst activity itself. Example 2 demonstrate ammonia absorption kinetics at 400° C. using different absorbents. Example 3 illustrates a reactor having a catalyst and an absorbent to increase ammonia synthesis.

Example 1: Catalyst

Figure 2:
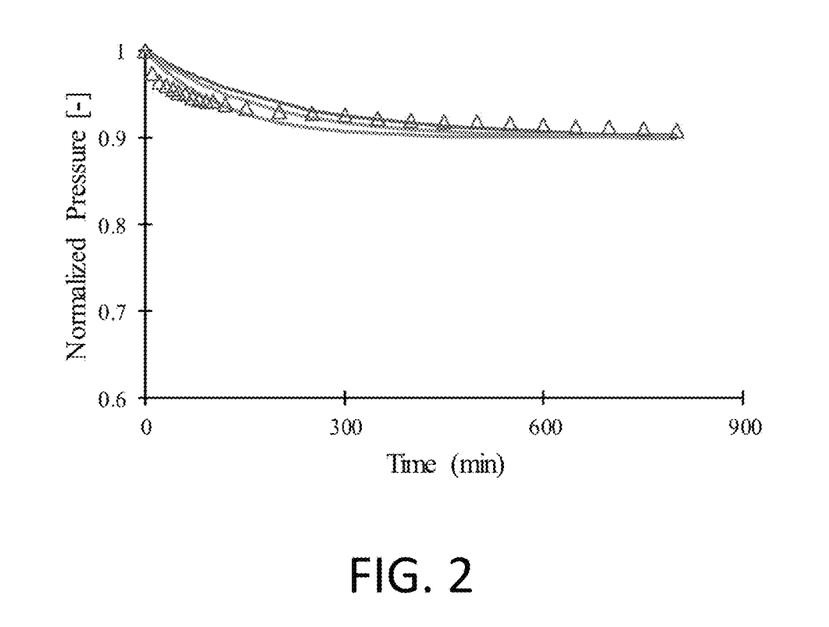
FIG. 2 is a graph of normalized pressure over time of a reactor having a catalyst disposed therein for converting hydrogen and nitrogen to ammonia.

Tests were conducted using a Parr reactor with catalyst alone. FIG. 2 illustrates catalytic conversion of hydrogen and nitrogen to ammonia. Experiments in a batch reactor with a Fe-based catalyst at 400° C. and an initial pressure of 27 bar H2/N2(3:1) approached an equilibrium conversion of 90%. The experimental data are marked with red triangles, while three literature correlations are shown as solid lines.

The pressure within the reactor decreased from its initial value by around 10% in 5 h and then remained constant. These data are consistent with the wide range of correlations in the literature, summarized by the curves in FIG. 2. Differences between these correlations reflect the difficulty of working the rapid reverse reaction. (This is why some correlations predict an initial reaction rate of infinity when no ammonia is present.) The observed change in the catalytic reaction rate is consistent with the models of the initial rate of ammonia synthesis on iron-based catalysts; the constant pressure observed at long times is consistent with the equilibrium pressure for the ammonia-nitrogen-hydrogen equilibrium at this temperature and pressure.

Example 2: Absorbent

Figure 3:
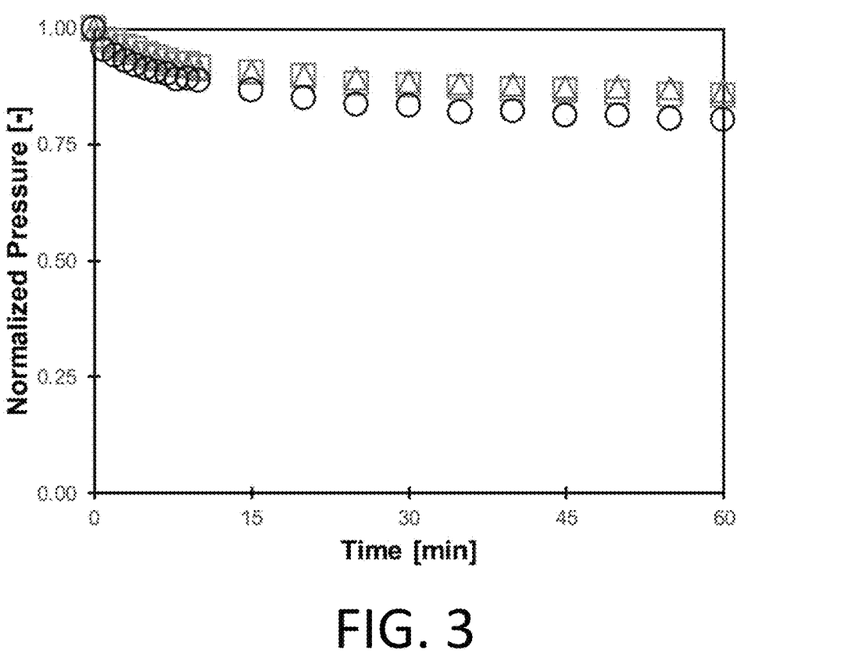
FIG. 3 is a graph of normalized pressure over time of a reactor having a magnesium chloride on silica absorbent disposed therein for absorbing ammonia.

Experiments were also conducted by loading absorbents into the reactor without the catalyst, pressurizing the system with ammonia at 400° C. and measuring pressure vs time. Metal salts can form a stoichiometric compound between the salt and ammonia. For example, magnesium chloride at 400° C. reacts with ammonia largely with the following stoichiometry $MgCl_2(s)+NH_3 \leftrightarrow MgCl_2(NH_3)(s)$ (eqn. 12). FIG. 3 shows absorption of ammonia by magnesium chloride. The uptake of ammonia gas absorbed in MgCl2/SiO2 at 400° C. is reported for a batch reactor with an initial pressure of 2.4 bar. Three experiments are shown.

When this reaction is fast, it reaches equilibrium. Because the two solids have a thermodynamic activity of one, this equilibrium is essentially a critical partial pressure for the ammonia-containing complex. When the actual ammonia pressure is below this critical value, no complexed salt forms. When the ammonia pressure is above this critical value, complexed salt forms until either ammonia or uncomplexed salt is exhausted.

The complete conversion of metal salts to the product stoichiometry of eqn. 12 is rarely observed. Instead, the amount of ammonia absorbed by the salt is a function not only of thermodynamics but also of the kinetics of ammonia uptake within the metal salt crystal. Experiments on the absorption of ammonia at 400° C. by various salts explore the effects of kinetics and thermodynamics. Measurements with $CaCl_2$) above 350° C. showed only modest absorption. Measurement with $MgCl_2$ gives significant absorption above ammonia pressures of 1 bar, as shown in FIG. 3.

Figure 4:
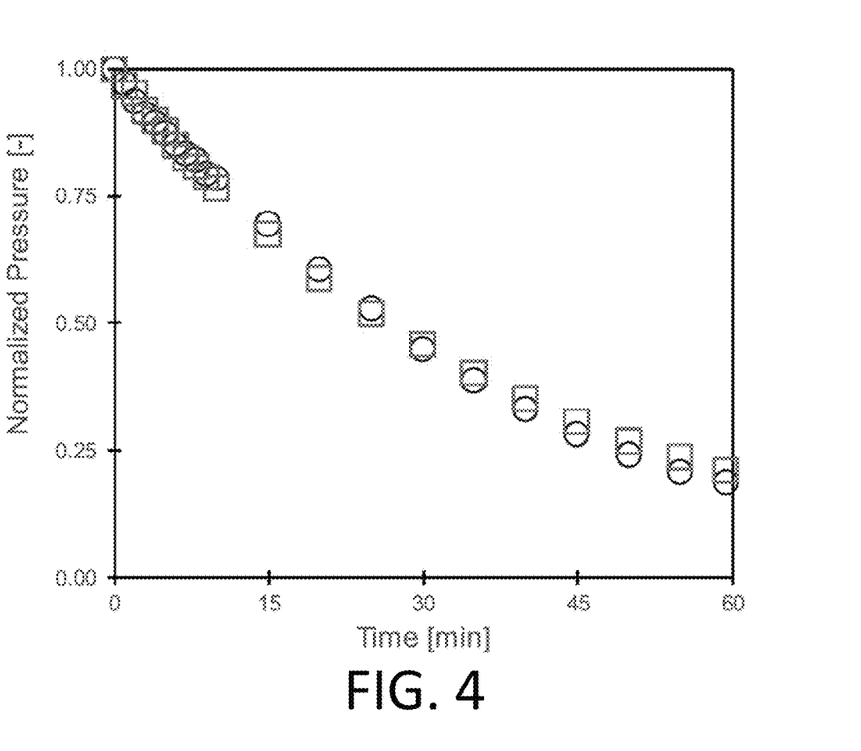
FIG. 4 is a graph of normalized pressure over time of a reactor having a nickel chloride on silica absorbent disposed therein for absorbing ammonia.

FIG. 4 shows absorption of ammonia by nickel chloride. The uptake of ammonia absorbed in NiCl2/SiO2 at 400° C.

is depicted for a batch reactor with an initial pressure of 2.4 bar. Two experiments are presented. Nickel chloride absorbs more ammonia at 400° C. than the other chlorides, as shown in FIG. 4. NiCl$_2$ exhibits significant uptake even at lower partial pressures of ammonia.

is the opposite of what is expected for diffusion limitations; we suspect this is due to temperature changes.

Results are summarized in Table 1:

TABLE 1

Results from Example 2 isothermal experiments on ammonia synthesis.

| Sl. No. | Catalyst (g) | Absorbent (g) | Stirrer Speed (rpm) | P* (barG) | Absorbent | K (L/sec) ×E−05 | P+ | R$^2$ |
|---|---|---|---|---|---|---|---|---|
| 1 | 16 | 0 | 0 | 371.58 | NA | 2.0 | | 0.99 |
| 2 | 16 | 0 | 700 | 371.75 | NA | 2.0 | 313 | 0.99 |
| 12 | 4 | 36.5 | 0 | 293.88 | MgCl$_2$—SiO$_2$ | 1.0 | | 0.98 |
| 13 | 4 | 36.5 | 0 | 349.26 | MgCl$_2$—SiO$_2$ | 1.0 | | 0.97 |
| 3 | 16 | 16 | 700 | 304.50 | MgCl$_2$—SiO$_2$ | 0.83 | | 0.97 |
| 4 | 16 | 16 | 700 | 303.55 | MgCl$_2$—SiO$_2$ | 1.33 | | 0.93 |
| 5 | 16 | 16 | 700 | 323.88 | MgCl$_2$—SiO$_2$ | 1.33 | | 0.96 |
| 10 | 32 | 2 | 0 | 309.11 | MgCl$_2$—SiO$_2$ | 1.50 | | 0.96 |
| 11 | 32 | 2 | 0 | 303.14 | MgCl$_2$—SiO$_2$ | 1.50 | | 0.95 |
| 8 | 32 | 2 | 700 | 326.24 | MgCl$_2$—SiO$_2$ | 1.33 | | 0.93 |
| 9 | 32 | 2 | 700 | 323.20 | MgCl$_2$—SiO$_2$ | 1.33 | | 0.95 |
| 6 | 16 | 8 | 0 | 367.62 | CaCl$_2$—SiO$_2$ | 2.0 | | 0.97 |
| 7 | 16 | 8 | 0 | 358.80 | CaCl$_2$—SiO$_2$ | 2.0 | 358 | 0.98 |

Example 3: Catalyst and Absorbent

Figure 5:
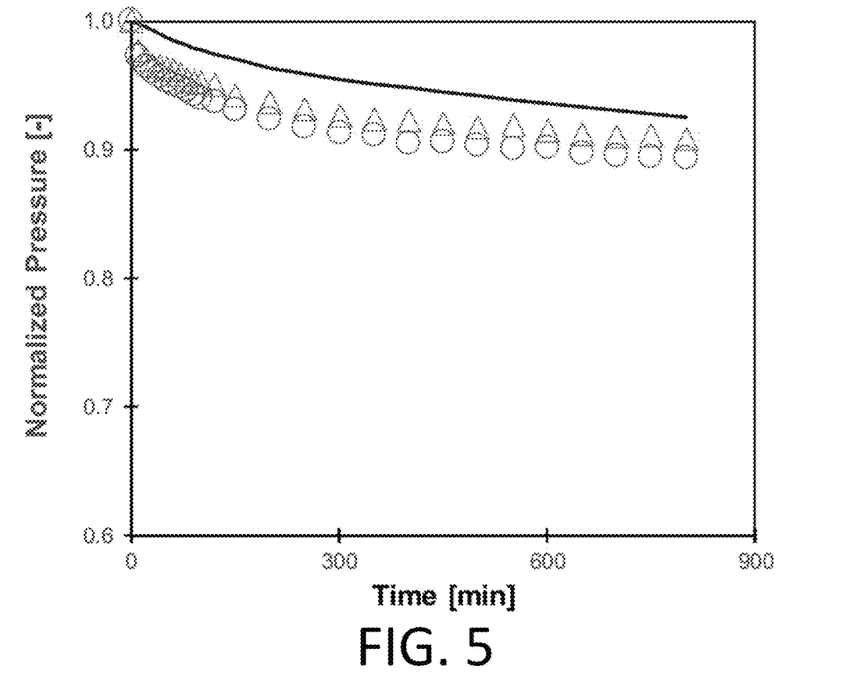
FIG. 5 is a graph of normalized pressure over time of a reactor having a nickel chloride on silica absorbent disposed therein for absorbing ammonia.
Figure 6:
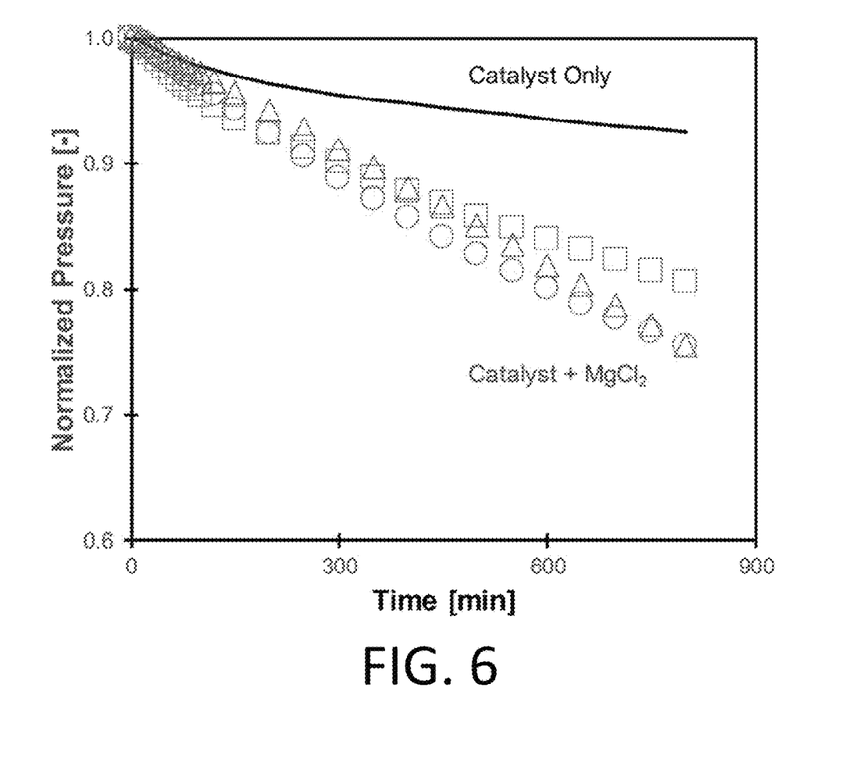
FIG. 6 is a graph of normalized pressure over time of a reactor having a catalyst and an absorbent disposed therein for converting hydrogen and nitrogen to ammonia in accordance with some embodiments of the present disclosure.
Figure 7:
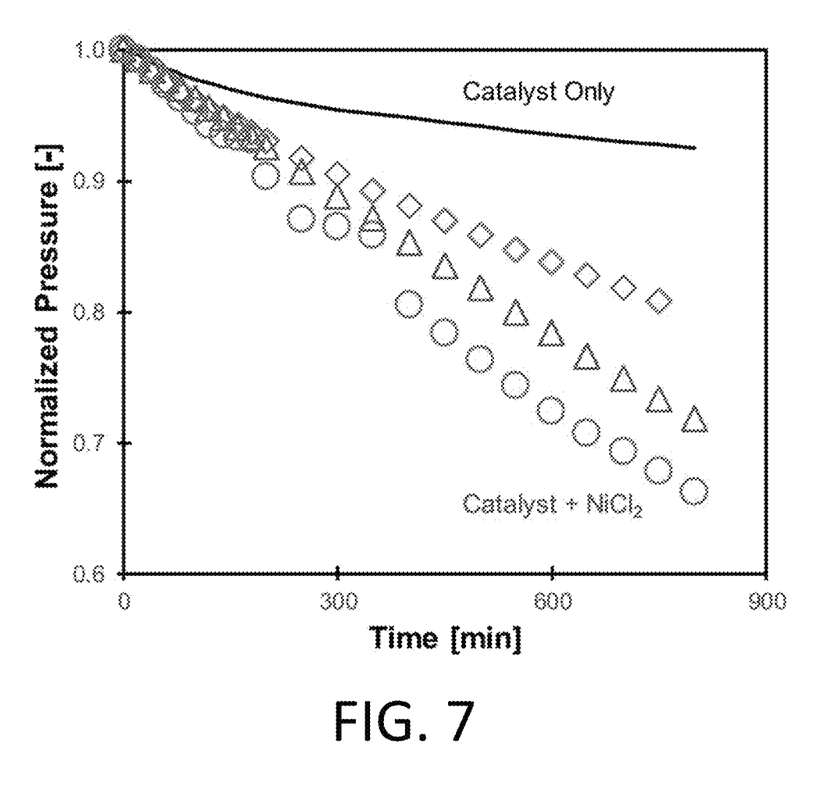
FIG. 7 is a graph of normalized pressure over time of a reactor having a catalyst and an absorbent disposed therein for converting hydrogen and nitrogen to ammonia in accordance with some embodiments of the present disclosure.

Experiments in the integrated reactor were performed by adding a stoichiometric mixture of nitrogen and hydrogen (1:3) without ammonia to the reactor containing specific amounts of both catalyst and absorbent. The measured pressure changes due to the formation of ammonia are shown in FIGS. 5-7. (In these figures, different symbols refer to different experiments.) FIG. 5 shows an integrated reactor with calcium chloride. A batch reactor containing the catalyst and CaCl$_2$ sorbent exhibits modest conversion after 600 min at 400° C. and an initial pressure of stoichiometric H$_2$/N$_2$ (3:1) of 27 bar. For comparison, the data for the system with only a catalyst (no sorbent) is included as a solid line. FIG. 6 shows an isothermal reactor with magnesium chloride. A batch reactor containing the catalyst and MgCl$_2$ exhibits greater conversion after 600 min at 400° C. and an initial pressure of stoichiometric H$_2$/N$_2$ (3:1) of 27 bar. For comparison, the data for the system with only a catalyst is included as a solid line. FIG. 7 shows an integrated reactor with nickel chloride. A batch reactor containing the catalyst and NiCl2 exhibits still greater conversion after 600 min at 400° C. and an initial pressure of stoichiometric H2/N2 (3:1) of 27 bar. For comparison, the data for the system with only a catalyst is included as a solid line.

The catalyst and calcium chloride together in an integrated reactor yield slightly improved results dramatically different from the catalyst alone, as shown in FIG. 5. Results for magnesium chloride in FIG. 6 exhibit greater conversion since the absorption of product ammonia is significant. The integrated reactor with nickel chloride outperforms the other sorbents, as shown by the faster conversions in FIG. 7.

Example 4

Tests were also conducted in a Parr reactor with a 100 cm$^3$ volume, operated in batch without flows. Tests were conducted using 4 g, 16 g, and 32 g of catalyst (e.g., iron oxide) and 0 g, 2 g, 8 g, or 16 g of absorbent material (e.g., MgCl$_2$ on silica). In some tests, stirring occurred at 700 rpm. Conversion often was slightly faster without stirring, which

DISCUSSION

Embodiments of the present disclosure provide a reactor comprising an absorbent and a catalyst. In some embodiments, this process allows for both synthesis and separation to be run at the same temperature. In the conventional process, the synthesis reactor runs at 400° C., and the separation is by condensation at −20° C. Reactors having both absorbent and catalyst offer advantages over conventional processes. For example, combining the reaction and absorption may offer an alternative to recycling the unreacted gases, a step that, in past studies, can compromise the overall rate of ammonia production. The reactor having both the absorbent and the catalyst may also offer advantages in reducing equipment size (e.g., at least a 5-fold reduction in size) thereby reducing capital expenditure at scale.

The invention has been described according to one or more preferred embodiments, and it should be appreciated that many equivalents, alternatives, variations, and modifications, aside from those expressly stated, are possible and within the scope of the invention.

We claim:

1. An apparatus for producing ammonia, the apparatus comprising:
    a reactor comprising a vessel with an internal volume, the reactor having:
        (i) an inlet to receive an inlet gas comprising nitrogen and hydrogen,
        (ii) a catalyst and an absorbent intermixed within the internal volume of the vessel, the catalyst configured to convert the nitrogen and the hydrogen to a reaction mixture comprising ammonia, unreacted nitrogen, and unreacted hydrogen, the absorbent configured to selectively absorb a portion of the ammonia in the reactor during formation of the reaction mixture, and
        (iii) an outlet to discharge the reaction mixture from the reactor, wherein the catalyst and absorbent are intermixed in a fixed bed arrangement.

2. The apparatus of claim 1, wherein the catalyst is present in the reactor in an amount of at least 5% (w/w), based on the total weight of the catalyst and the absorbent.

3. The apparatus of claim 2, wherein the catalyst is present in the reactor in an amount from 5% (w/w) to 95% (w/w), based on the total weight of the catalyst and the absorbent.

4. The apparatus of claim 1, wherein the absorbent is present in the reactor in an amount of at least 5% (w/w), based on the total weight of the catalyst and the absorbent.

5. The apparatus of claim 1, wherein the absorbent is a solid absorbent.

6. The apparatus of claim 1, wherein the catalyst and absorbent are present in the reactor in a weight ratio of catalyst to absorbent of at least 1:20 (catalyst:absorbent).

7. The apparatus of claim 1, wherein the catalyst and absorbent are present in the reactor in a weight ratio of catalyst to absorbent from 1:20 to 20:1 (catalyst:absorbent).

8. The apparatus of claim 1, wherein the absorbent comprises a metal halide and a solid support.

9. The apparatus of claim 8, wherein the metal halide is selected from the group consisting of $MgCl_2$, $CaCl_2$, $MgBr_2$, $CaBr_2$, MgClBr, CaClBr, nickel chloride, and MgCaBr.

10. The apparatus of claim 8, wherein the solid support is selected from silica or a zeolite.

11. The apparatus of claim 1, wherein the catalyst comprises a metal catalyst.

12. The apparatus of claim 11, wherein the metal catalyst comprises at least one transition metal dispersed on a support material, wherein the transition metal is selected from the group consisting of Fe and Ru.

13. The apparatus of claim 1, wherein the reactor is configured to operate in batch mode without flow.

14. The apparatus of claim 1, wherein the absorbent is configured to release a portion of the ammonia upon reduction in pressure.

\* \* \* \* \*

UNITED STATES PATENT AND TRADEMARK OFFICE
CERTIFICATE OF CORRECTION

PATENT NO. : 11,873,227 B2
APPLICATION NO. : 16/849550
DATED : January 16, 2024
INVENTOR(S) : Edward Cussler et al.

It is certified that error appears in the above-identified patent and that said Letters Patent is hereby corrected as shown below:

In the Specification

Column 8, Line 31, "X" should be --$X^1$--.

Column 13, Line 50, eqn. 9, "$\dfrac{\frac{4}{3}pR_{cat}^3}{4pR_{cat}^2} = \dfrac{\rho_{cat}R_{cat}^2}{3DM_{cat}}$" should be -- $\dfrac{\frac{4}{3}pR_{cat}^3}{4pR_{cat}^2} = \dfrac{\rho_{cat}R_{cat}^2}{3DM_{cat}}$ --.

Column 13, Line 53, eqn. 10, "$\dfrac{\rho_{abs}R_{abs}^2}{3DM_{abs}}$" should be -- $\dfrac{\rho_{abs}R_{abs}^2}{3DM_{abs}}$ --.

Column 13, Line 63, eqn. 11, "$\left[\dfrac{1}{k_{cat}} + \dfrac{\rho_{cat}R_{cat}^2}{3D}\right]\dfrac{1}{M_{cat}} + \left[\dfrac{\rho_{abs}R_{abs}^2}{3D} + \dfrac{1}{k_{abs}}\right]$" should be -- $\left[\dfrac{1}{k_{cat}} + \dfrac{\rho_{cat}R_{cat}^2}{3D}\right]\dfrac{1}{M_{cat}} + \left[\dfrac{\rho_{abs}R_{abs}^2}{3D} + \dfrac{1}{k_{abs}}\right]$ --.

Signed and Sealed this
Twenty-sixth Day of March, 2024

Katherine Kelly Vidal
*Director of the United States Patent and Trademark Office*